May 9, 1967
R. PROHASKA
3,318,187
DISPLAY DEVICE AND REFLECTIVE ELEMENTS THEREFOR
Filed Aug. 20, 1965
3 Sheets-Sheet 1
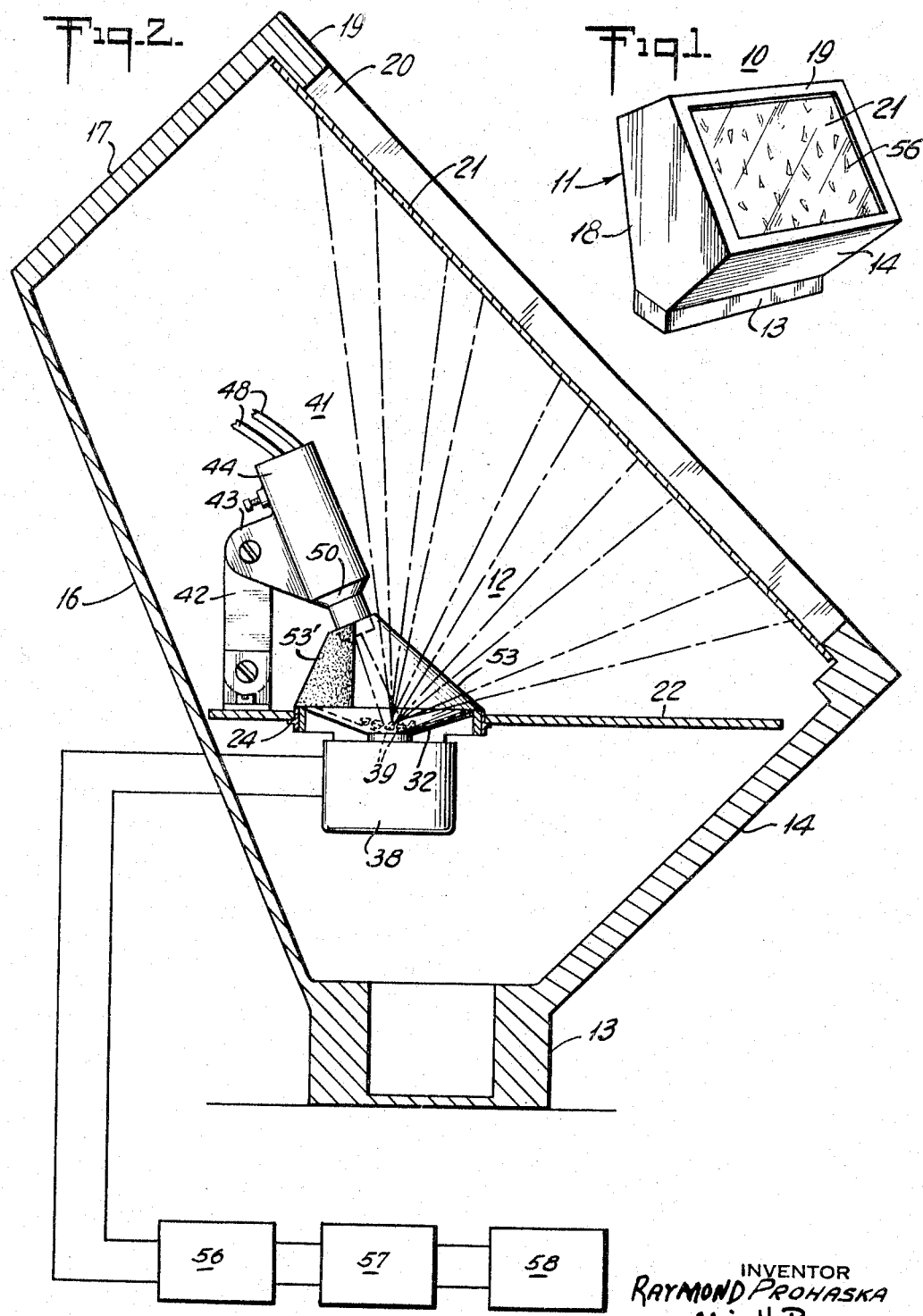
INVENTOR
RAYMOND PROHASKA
BY Chiset L Bronson
ATTORNEY May 9, 1967 R. PROHASKA 3,318,187
DISPLAY DEVICE AND REFLECTIVE ELEMENTS THEREFOR
Filed Aug. 20, 1965 3 Sheets-Sheet 2
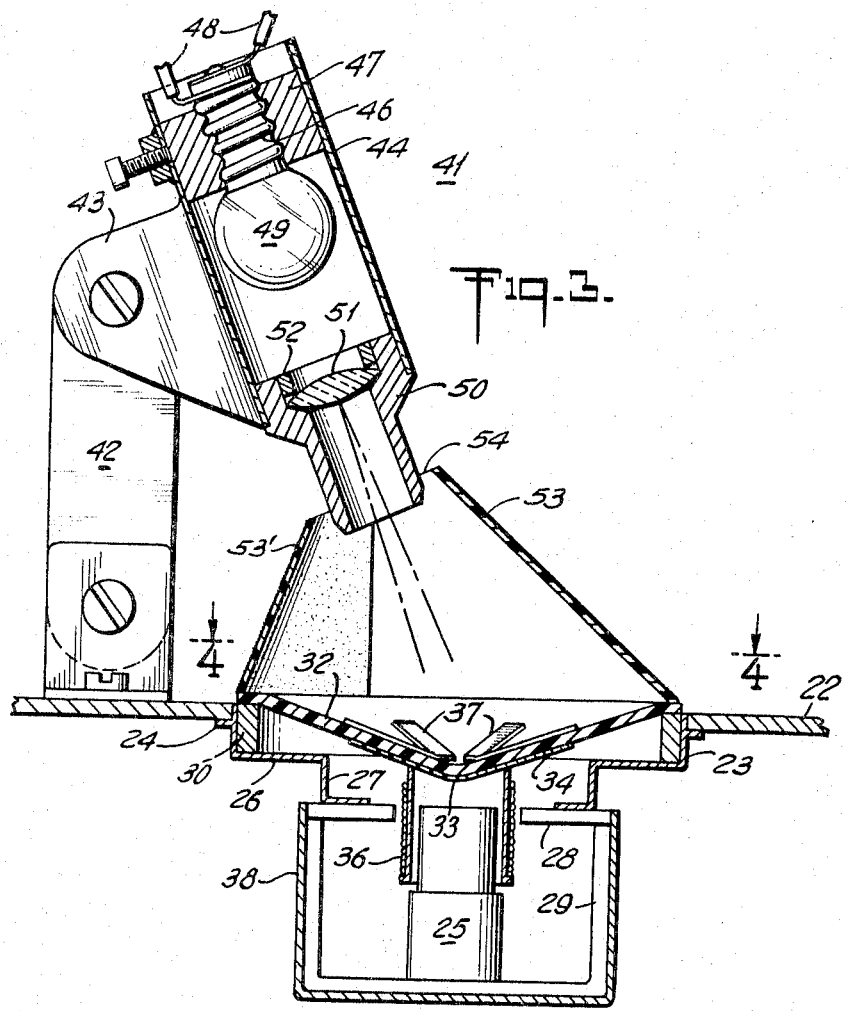
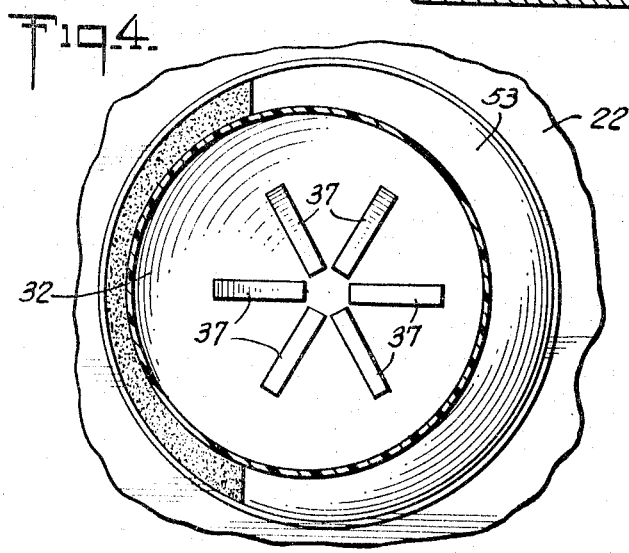
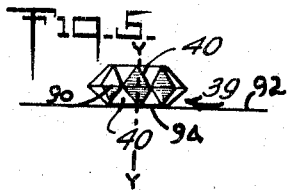
INVENTOR
RAYMOND PROHASKA
BY Chu H Bronson
ATTORNEY May 9, 1967  R. PROHASKA  3,318,187
DISPLAY DEVICE AND REFLECTIVE ELEMENTS THEREFOR
Filed Aug. 20, 1965  3 Sheets-Sheet 3
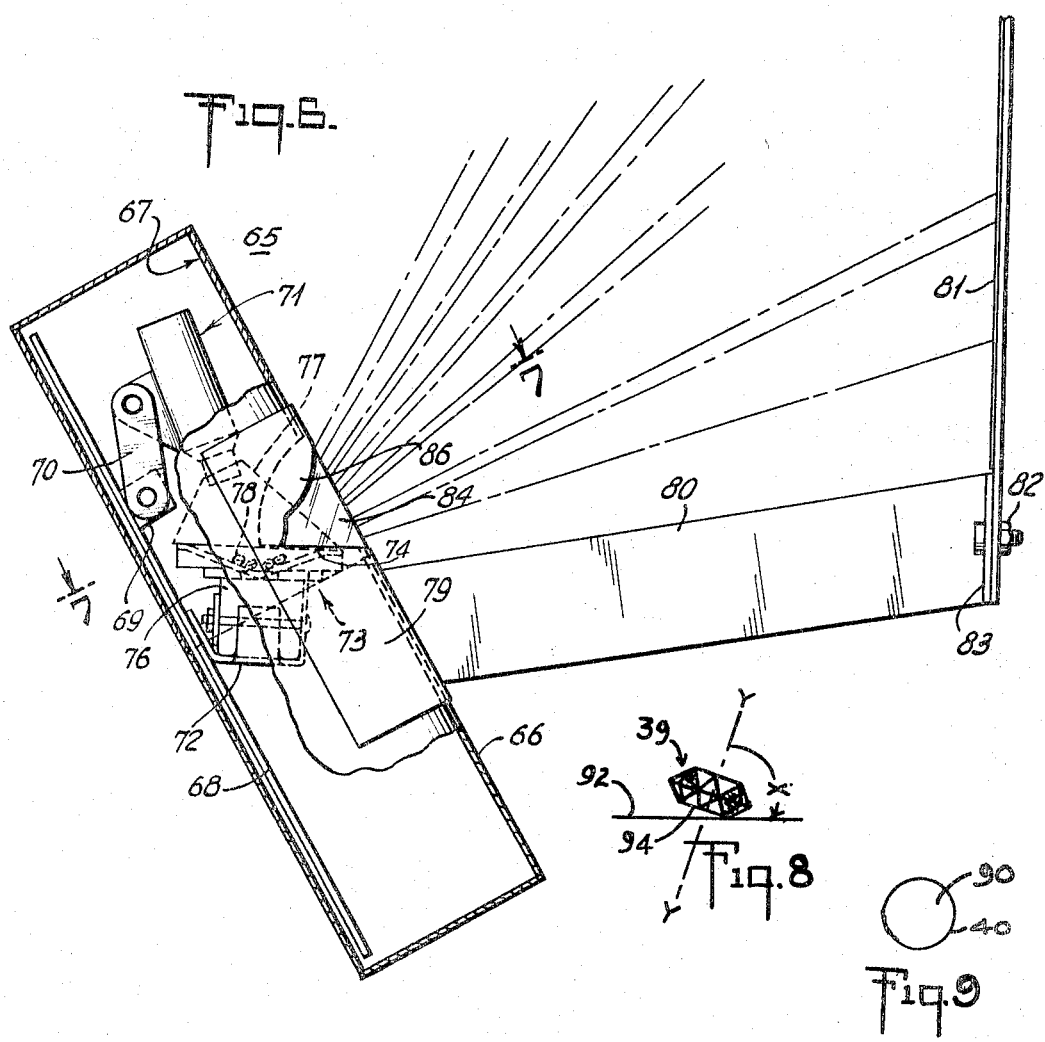
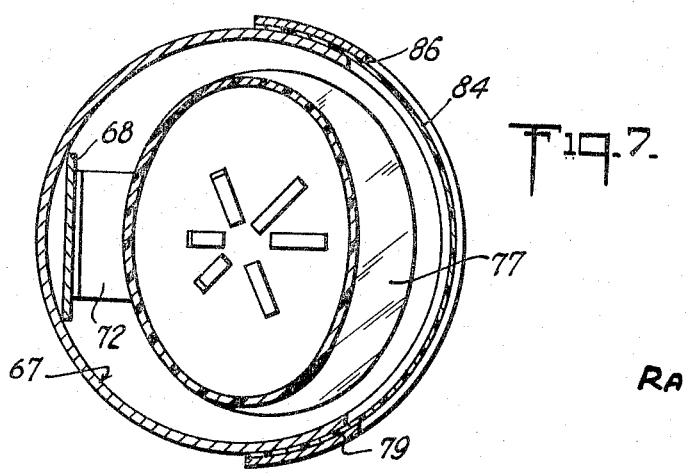
INVENTOR
RAYMOND PROHASKA
BY
ATTORNEY

United States Patent Office

3,318,187
Patented May 9, 1967

3,318,187
DISPLAY DEVICE AND REFLECTIVE ELEMENTS THEREFOR
Raymond Prohaska, Brooklyn, N.Y., assignor to Charles Washburn, New York, N.Y.
Filed Aug. 20, 1965, Ser. No. 481,303
12 Claims. (Cl. 88—24)

This invention is a continuation-in-part of copending application Ser. No. 62,071 filed Sept. 15, 1960, and now abandoned.

The present invention relates generally to improvements in visual display devices and relates particularly to an improved art form or media of a dynamic color nature effected by the employment of novel light reflective elements therewith.

The use of visual displays involving changing color patterns is well known. However, those heretofore proposed and employed possess many drawbacks and disadvantages. They are complex and costly; are lacking in flexibility and versatility; are difficult or impossible to associate with other forms of artistic expressions, and otherwise leave much to be desired.

It is therefore, a principal object of the present invention to provide an improved art form or media of visual expression.

Another object of the present invention is to provide a preferred form of light-reflective elements, said elements being capable of rocking in response to external vibration and of promptly ceasing to move when vibration ceases.

A further object of the present invention resides in the provision of novel reflective elements which are sufficiently stable so as to preclude vibratory response thereof to minimal vibrations and which will rockingly respond to a wide vibratory range, movement thereof being proportionate to external vibrations.

Another object of the invention is to provide a preferred form of reflective element which will respond to the surface movement of a movable medium and which will return to its normal position relative thereto upon cessation of said movement.

Still another object of the present invention is to provide an improved optical apparatus for projecting a changing color image formed by the movement of the novel reflecting elements.

A further object of the present invention is to provide an improved optical apparatus for projecting a plurality of colored images varying and moving in response to audio signals which may comprise music or the like.

The above and other objects of the present invention will become apparent from the reading of the following description taken in conjunction with the accompanying drawings wherein:

FIGURE 1 is a perspective view of an apparatus embodying the present invention;

FIGURE 2 is an enlarged side elevational view thereof, the housing being shown in section and the electrical network in block diagram;

FIGURE 3 is an enlarged detailed vertical transverse sectional view of the projecting system;

FIGURE 4 is a sectional view taken along line 4—4 in FIGURE 3;

FIGURE 5 is a front elevational view of a preferred form of reflecting element;

FIGURE 6 is a side elevational view, partially in section and partially broken away of another embodiment of the present invention;

FIGURE 7 is a sectional view taken along line 7—7 in FIGURE 6;

FIGURE 8 is an elevational view of the reflecting element as it is rocking in response to external vibration; and FIGURE 9 is a plan view showing the reflective face of one of the half stones which form the reflecting element; and FIGURE 10 is a plan view of the faceted external surface and flat portion of the stone.

In a sense, the present invention contemplates the provision of an improved display device of the character set forth, comprising a support member, a plurality of reflecting elements located on and freely movable relative to said support member, means vibrating said support member at an audio frequency, means directing a beam of light at said reflecting elements, and a screen located in the path of the light reflected by said elements.

According to a preferred form of the present invention, the support member is defined by a cone formed of an elastomeric material and supported along its border. The apex portion of the cone carries a depending voice coil which registers with the field of a permanent magnet and is connected by way of an audio amplifier to any suitable source of audio signal such as phonograph pick-up, a radio tuner, or the like. It will be understood that the support member may be a flat surface with means peripherally disposed thereabout to preclude said reflective elements from leaving said flat surface. Therefore, e.g., the apex portion alone may be utilized. The reflecting elements are in the form of multifaceted bodies such as natural or synthetic stones or the like which are provided with a plurality of angularly related facets or faces thereon. The reflecting elements are preferably formed of a transparent material which may be colored, and at least some are advantageously provided with a light-dispersing coating effecting a multicolor reflection and are of the type known as Aurora gems. It has been further found that highly superior results are achieved where the reflecting elements are pairs of faceted stones having flat reflecting rear faces which are connected in abutting relationship. The light means is in the form of a projector including an electric bulb having a relatively small filament or a substantially pointed light source and a lens for directing a narrow beam of light from the filament towards the reflecting elements which rest on the support member in the vicinity of the apex thereof. The light beam may be directed at the apex of the cone but is preferably aimed at a point eccentric thereto. A screen, either translucent or opaque, is located in the path of the light reflected from the elements.

Referring now to the drawings and more particularly to FIGURES 1 through 5, 8 and 9, thereof, which illustrate a preferred embodiment of the present invention, the reference numeral 10 generally designates the improved display device which includes a housing 11 and a projecting system 12. The housing 11 comprises a laterally extending base portion 13, a rectangular wall 14 projecting upwardly and forwardly from the base 13, and a rear wall 16 projecting upwardly and rearwardly from the base 13. Directed upwardly and forwardly from the upper edge of the wall 16 is a top wall 17, the peripheral edges of the walls 13, 14, 16 and 17 delineating the edges of side walls 18 which include inclined front edges extending between the front ends of the walls 14 and 17. An inwardly directed bezel defining rectangular flange 19 extends from the front edges of the walls 14, 17 and 18 and delineates a rectangular window 20. Registering with the window and suitably secured to the rear face of the flange 19 is a translucent screen 21 formed of any suitable material, for example, frosted glass.

Suitably supported within the housing 11 below the screen 21 is a horizontal shelf 22. The shelf 22 has a circular opening formed therein forward of the rear edge thereof, and a ring 23 of a support frame registers with the circular opening and is suitably affixed to the shelf 22 by means of an outwardly projecting peripheral flange 24 abutting the underface of shelf 22. A flange member 26 projects inwardly from the ring 23 and terminates in a depending bracket ring 27 which is secured to an apertured bridge member 28 supported by a yoke 29 which carries a magnet 25 delineating at its upper section with the edge of the bridge aperture a high magnetic flux gap.

Nesting in the ring 23 and resting on the flange 26 is a support ring 30 formed of a phenolic resin or other suitable material. A conically-shaped diaphragm member 32, having a depending apex 33, has its border 34 suitably secured to the upper edge of the ring 30. The diaphragm member 32 is formed of an elastomeric material such as natural or synthetic rubber and is advantageously formed of a soft foam rubber, for example, of about $1/16$ inch thickness. Abutting the underface of the diaphragm 32 and suitably affixed thereto is a correspondingly formed, relatively stiff conical reinforcing member 34 which is of substantially less diameter than the elastomeric diaphragm 32. Secured to and depending from the reinforcing member is a helical voice coil 36 which slidably registers with the magnetic gap as is well known. A plurality of radially projecting, relatively low friction bands 37 is located on and cemented to the upper face of the diaphragm 32 and may consist of strips of vinyl tape or the like. The transducer defining assembly including the magnet and yoke, is covered by a housing 38 in the usual manner. It should be noted that, except for the structure of the conical diaphragm 32 and its support as well as the reinforcing cone 34 and strips 37, the mechanism last described is similar to the conventional permanent magnet dynamic speaker. The speaker should respond to frequencies preferably between 100 and 1000 cycles per second. A ½ watt 2¾ inch permanent magnet dynamic speaker has been found to be highly satisfactory.

A plurality of reflecting elements 39 is located on the diaphragm 32 and gathers towards the apex thereof by reason of the inclined walls of the diaphragm 32. The reflecting elements 39 may be of various shapes and colors and are preferably transparent and as shown in FIGURE 5 of the drawings. They should be multifaceted as typified by the cut gem stones or rhinestones, or the like. Moreover, some of the reflecting elements 39 may be advantageously provided with internally reflecting rear faceted surfaces which are typical of rhinestones. Furthermore, highly attractive effects are achieved where at least some of the multifaceted bodies 39 are provided with light-dispersing coatings of the nature of the Aurora gem coatings wherein varying multicolored reflections are produced. The reflecting elements 39 are advantageously of the form illustrated in FIGURE 5 and consist of a pair of similar faceted halves 40 having flat inner faces 90 of a reflecting nature, said faces being suitably cemented to each other to provide a unitary element. The element 40, moreover, should preferably be of a lesser height than width to inhibit the rolling thereof. The element is capable of rocking and rolling responsively to external vibrations generally transmitted thereto by vibrating surface 92 upon which it is supported. Excitement of the element, as aforedescribed, causes the normally vertical axis Y—Y thereof to become angularly oriented with respect to said surface 92, the angles X thus formed being variably proportionate to the amplitude and frequency of the vibration. FIGURE 8 illustrates the element at an instant during which the vertical axis thereof forms an angle with the vibrating surfaces, it being understood that angle X may vary over a wide range in response to the vibrations.

Not withstanding the rockable nature of the reflective elements utilizable herein, each element is, however, provide with at least one flat portion 94 along its rockable external surface to thereby render said element stable and capable of returning to an attitude whereby axis Y—Y thereof becomes perpendicular with respect to supporting surface 92 upon cessation of vibration. It will be appreciated that said flat portion may be relatively large or small, it being noted, that the smaller the flat portion, the greater the sensitivity of said element to the external vibration, and conversely, therefore, a large flat portion as shown in the accompanying drawings will render said element highly stable and thus less sensitive to vibration.

It will, therefore, be understood that the generally arcuate faceted external surface of the reflective element affords the rockable attribute thereto, the flat portion, however, rendering the stabilizing characteristic aforedescribed. Thus, suitable reflective element constructions other than the preferred embodiment herein illustrated may be utilized in display devices of the present and analogous natures, the essential requirements being that such elements be rockable when vibrated and stable upon cessation of vibration.

A light beam source 41 is mounted on the platform 22 rearwardly of the diaphragm 32 and is adjustable both about a vertical axis and about a horizontal axis. The light source 41 includes an upright 42 secured to the platform 22 in any suitable manner so as to be rotatably adjustable about its vertical axis. A bracket plate 43 is pivoted to the upper end of the upright 42 so as to be angularly adjustable about a laterally extending horizontal axis and supports a tubular barrel 44 directed toward the diaphragm 32 and is capable of being oriented in different directions. Nesting in the upper end of the barrel 44 is a conventional light bulb socket 46 provided with an insulating sleeve 47 tightly adjustably engaged by the inner face of the barrel 44 to permit the rotary and longitudinal movement thereof. The contact elements of the socket are connected to a suitable source of electric current by way of wire leads 48 and an electric light bulb 49 preferably of the type having a light source of small dimensions, such as a tightly formed helical filament, is carried by the socket 46.

Registering with the lower end of the barrel 44 is a tubular lens mount 50 in the barrel 44 which carries a projector lens 51 locked in position by means of a ring 52. It should be noted that the focal length of the lens 51 and its position relative to the filament of the bulb 49 is such that the lens filament spacing is axially adjustable between a position which focuses the image of the filament at a point short of diaphragm 32 and a position of image focus of at least several feet. Thus, the patterns on the screen may be distorted filament shapes. In order to prevent the reflecting elements 39 from being thrown from the diaphragm, there is provided a substantially conically-shaped shield 53 formed of a transparent material, the lower edge of the shield 53 being secured to the border of the diaphragm 32 and the upper section of the shield 53 having a circular opening 54 formed therein through which the lens mount 50 extends. The rear face of the shield 53 is provided with a non-reflecting coating 53' to delimit the light from the projector to that which is directly reflected from the elements 39 to the area of the screen. Where a flat supporting surface, as aforedescribed, is utilized, a glass bubble may be placed thereover to prevent said elements from being thrown therefrom during vibration of said surface.

The voice coil 36 is connected to the output of any suitable audio amplifier 56, the input of which is coupled preferably through an equalizing, peak limiting, and adjustable volume compression network 57 to an audio signal source 58. This audio signal 58 may be of any type of recording playback device such as a tape recorder, a phonograph, a radio tuner, an audio signal generator, the electric signal output of an electronic organ, an accordion pickup, or the like, or any other desirable audio frequency source. The circuit 57 may be of any well-known type and may have a characteristic in which greater compression or equalization is effected at the lower frequencies or at the higher frequencies or at both ends of the audio spectrum.

Considering now the operation of the novel apparatus described above, the diaphragm 32 is vibrated by the drive or transducer unit including the voice coil 36 which is energized by the amplifier 56 in accordance with the signal originating at the source 58. The vibrating diaphragm 32 excites and imparts various motions to the reflecting elements 39 in accordance with the frequencies and amplitudes of vibrations of the diaphragm 32. The motions of the reflecting elements 39 are of numerous types including spin gyration, linear motion, bouncing, etc., the presence of the vinyl strips 37 contributing to the variety of motions. The light beam which is directed at the elements 39 is reflected in various directions and projected upon the screen 21 in the form of images 56 will vary in color in accordance with the respective reflecting elements 39 and the surface coatings thereof, if any, and in size and shape. Furthermore, the images 56 are in constant movement and continuously change in shape and dimensions as well as in color, in accordance with the music or signal originating at the source 58 and presents a three dimensional effect. The visual effect is highly aesthetically pleasing, entertaining and is subject to a multitude of interpretations.

It should be noted that different optical effects and compositions are obtainable by varying the orientation of the beam of light from the projector 41. It may be directed at the center of the diaphragm 32 or at a point laterally or horizontally offset relative to the apex of the diaphragm 32 or both. Furthermore, more than one projecting apparatus 12 may be employed with a single screen 21 or a single transducer. For example, two sets of projecting systems 12 may be used and excited, by the outputs of a sterophonic playback device. In addition, different light filters may be used with the light beam projectors 41 or the shield 53 may be variously colored or modified.

Referring now to FIGURES 6 and 7 of the drawings which illustrate another embodiment of the present invention which differs from that previously described primarily in that a different type of screen is employed, the numeral 65 designates the projector system which includes an inclined cylindrical housing 66 provided with a separable top section 67 affording access to the housing 66. Located in and along the rear wall of the housing 66 is a support spine 68 on the upper section of which is affixed a bracket 69. An arm 70 is pivoted at its lower end to the bracket 69 and swingably supports at its upper end a light beam source 71 similar to that previously described.

Also affixed to the plate 68 below the projector 71, is a bracket 72 which supports an exciter unit 73 in a substantially horizontal position which may be variously adjustable. The exciter unit 73 is like that of the first embodiment and includes a conical diaphragm 74 of elastomeric material, a transducer 76 and a transparent shield 77. The reflecting elements 78 rest on the diaphragm 74 and are excited by the diaphragm 74 which is motivated by the transducer 76 energized at an audio frequency in the manner earlier set forth.

The housing 66 is suitably supported by an arcuate, apertured bracket 79 mounted at one end of a longitudinally extending connecting arm 80. A relatively large, opaque self-supporting screen 80 is releasably affixed to the opposite end of the arm 80 by means of nuts and bolts 82 engaging the lower border of the screen 81 and a bracket plate 83 carried by the arm 80. Formed in the front wall of the housing 66 above the diaphragm 74 is a window defining opening 84 registering with the bracket aperture and covered by a sheet 86, a portion of the section thereof which registers with the window 84 being transparent so as to delimit the light beams from the projector system 65 to the area of the screen 81.

The operation of the apparatus last described is similar to that of the first embodiment and the device may be modified and employed in the manner earlier set forth.

While there have been described and illustrated preferred embodiments of the present invention, it is apparent that numerous alterations, omissions and additions may be made without departing from the spirit thereof.

What is claimed is:

1. In a display device including a plurality of movable light-reflecting elements utilized to reflect a changeable light array, wherein said light-reflecting elements each comprise a pair of similar faceted halves of cut transparent stones which together form a unitary element, said element having flat inner internally reflecting faces, said faces being cemented to each other to form said unitary element.

2. In a display device including at least one movable light-reflecting element utilized to reflect a changeable light array, wherein said light-reflecting element comprises a pair of similar faceted halves of cut transparent stones which together form said unitary element, said element having flat inner internally reflecting faces, said faces being cemented to each other to form said unitary element.

3. In a display device including at least one movable light-reflecting element utilized to reflect a changeable light array, wherein said light-reflecting element comprises a pair of faceted halves of cut transparent stones which together form said unitary element, said element having flat inner internally reflecting faces, said faces being joined to each other to form said unitary element.

4. In a display device, the combination comprised of a support member, a plurality of reflecting elements located on and movable relative to said support members, each said reflecting element being a unitary transparent stone element constructed of a pair of halves having flat inner internally reflecting faces, said faces being cemented to each other, means vibrating said support member, and means directing a beam of light at said reflecting elements.

5. In a display device, the combination comprised of a support member, a plurality of reflecting elements located on and movable relative to said support member, each said reflecting element being a unitary transparent stone element constructed of a pair of similar halves having flat inner internally reflecting faces, said faces being cemented to each other, means vibrating said support member at an audio frequency, and means directing a beam of light at said reflecting elements.

6. In a display device, the combination comprised of a support member, a plurality of reflecting elements located on and movable relative to said support member, each said reflecting element being a unitary transparent stone element constructed of a pair of similar faceted halves having flat inner internally reflecting faces, said faces being cemented to each other, means vibrating said support member at an audio frequency, means directing a beam of light at said reflecting elements, and light-receiving means located in the path of the light reflected by said elements.

7. In a display device, the combination comprised of a conical support member having inclined walls and a depending apex disposed centrally of said walls, a plurality of reflecting elements located on and movable relative to said support member, each said reflecting element being a unitary transparent stone element constructed of a pair of halves having flat inner internally reflecting faces, said faces being cemented to each other, means vibrating said support member to cause movement of said reflecting elements, said elements being caused to gather towards said apex by reason of said inclined walls, and means directing a beam of light at said reflecting elements.

8. In a display device, the combination comprised of a conical support member having inclined walls, and a depending apex disposed centrally of said walls, a plurality of reflecting elements located on and movable relative to said support member, each said reflecting element being a unitary transparent stone element constructed of a pair of similar faceted halves having flat inner internally reflecting faces, said faces being cemented to each other, means vibrating said support member at an audio frequency to cause movement of said reflecting elements, said elements being caused to gather towards said apex by reason of said inclined walls, means directing a beam of light at said reflecting elements, and a light-receiving surface located in the path of the light reflected by said elements.

9. In a display device, a movable substantially horizontal supporting means; a plurality of light-reflecting elements, each said element comprising a faceted external surface including a flat portion on which said element rests upon said supporting means; said supporting means movably and contiguously supporting said element so that said element is rockable upon the faceted external surface in response to vibrations of said movable supporting means and so that said element returns to said resting position on said flat portion upon cessation of said vibrations.

10. In a display device as set forth in claim 9 wherein said reflecting elements include light-reflecting means, said light-reflecting means being disposed internally of said elements.

11. In a display device, a movable supporting means; a light-reflecting element comprising a faceted external surface including a flat portion on which said element rests upon said supporting means; said supporting means movably and contiguously supporting said element so that said element is rockable upon the faceted external surface in response to vibrations of said movable supporting means and so that said element returns to said resting position on said flat portion upon cessation of said vibrations.

12. In a display device including at least one movable light-reflecting element utilized to reflect a changeable light array, wherein said light-reflecting element comprises a generally arcuate rockable faceted external surface of predetermined configuration; a supporting surface, said element being movably and contiguously supported upon said supporting surface whereby said element is rockable upon the generally arcuate faceted external surface thereof in response to external vibrations, and whereby rocking of said element ceases upon cessation of said external vibrations, said generally arcuate faceted external surface thereof including a flat portion upon which said element rests upon said supporting surface upon cessation of said vibrations.

References Cited by the Examiner

UNITED STATES PATENTS

| | | | |
|---|---|---|---|
| 1,412,997 | 4/1922 | Bonneau et al. | 88—15 |
| 1,984,406 | 12/1934 | Foley | 88—61 |
| 1,990,867 | 2/1935 | Harvey | 88—15 X |
| 2,217,991 | 10/1940 | Peck et al. | 88—15 |
| 2,297,767 | 10/1942 | Hunt | 88—24 |
| 2,411,804 | 11/1946 | Plebanck | 88—24 |
| 2,607,269 | 8/1952 | Elsaesser | 88—24 |
| 2,665,609 | 1/1954 | Gilluly | 88—24 |
| 2,677,297 | 5/1954 | Wetzel | 84—464 |
| 3,048,075 | 8/1962 | Wright | 84—464 |

NORTON ANSHER, *Primary Examiner.*

H. H. FLANDERS, V. A. SMITH, R. A. WINTERCORN,
*Assistant Examiners.*